(12) United States Patent
Atluri et al.

(10) Patent No.: US 9,108,633 B1
(45) Date of Patent: Aug. 18, 2015

(54) HYBRID POWERTRAIN AND METHOD OF CONTROLLING SAME

(71) Applicant: GM GLOBAL TECHNOLOGY OPERATIONS LLC, Detroit, MI (US)

(72) Inventors: Venkata Prasad Atluri, Farmington Hills, MI (US); Chandra S. Namuduri, Troy, MI (US); Suresh Gopalakrishnan, Farmington Hills, MI (US); Alan G. Holmes, Clarkston, MI (US); William R. Cawthorne, Milford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/208,402

(22) Filed: Mar. 13, 2014

(51) Int. Cl.
| | | |
|---|---|---|
| *B60W 20/00* | (2006.01) | |
| *B60W 10/06* | (2006.01) | |
| *B60W 10/08* | (2006.01) | |
| *B60W 10/02* | (2006.01) | |
| *B60W 10/18* | (2012.01) | |
| *B60W 10/26* | (2006.01) | |
| *B60W 10/107* | (2012.01) | |

(52) U.S. Cl.
CPC ............... *B60W 20/10* (2013.01); *B60W 10/02* (2013.01); *B60W 10/06* (2013.01); *B60W 10/08* (2013.01); *B60W 10/107* (2013.01); *B60W 10/18* (2013.01); *B60W 10/26* (2013.01); *Y10S 903/93* (2013.01)

(58) Field of Classification Search
USPC .......................................................... 701/22
See application file for complete search history.

(56) References Cited

U.S. PATENT DOCUMENTS

| | | | |
|---|---|---|---|
| 6,909,201 B2 | 6/2005 | Murty et al. | |
| 7,739,016 B2 * | 6/2010 | Morris | 701/51 |
| 8,290,653 B2 * | 10/2012 | Hofbauer | 701/22 |
| 8,498,767 B2 * | 7/2013 | Kotani et al. | 701/22 |
| 8,886,425 B2 * | 11/2014 | Doering et al. | 701/55 |

(Continued)

OTHER PUBLICATIONS

Akitomo Kume and Masayoshi Takahashi; entitled: Mazda i-ELOOP Brake Energy Regeneration System and Strategy; aabc europe advanced automotive battery conference; dated Jun. 27, 2013; 20 pages.

(Continued)

*Primary Examiner* — Thomas Tarcza
*Assistant Examiner* — Alex C Dunn
(74) *Attorney, Agent, or Firm* — Quinn Law Group, PLLC

(57) ABSTRACT

A hybrid powertrain with an engine, motor/generator, a belt drive train, a starting mechanism and one or more switching devices for one or more energy storage devices has at least one electronic controller that executes a stored algorithm and controls the hybrid powertrain in accordance with the stored algorithm to establish multiple operating modes including an operating mode in which a first switching device establishes an electrical connection between a first energy storage device and the motor/generator. The operating mode established can be dependent upon a parameter of the first energy storage device, a parameter of the control system, a parameter of the motor/generator, and/or a parameter of said at least one actuator. For example, the stored algorithm can control the hybrid powertrain based on a capacity to restart the engine.

27 Claims, 9 Drawing Sheets

(56) References Cited

U.S. PATENT DOCUMENTS

| | | | | |
|---|---|---|---|---|
| 2002/0179348 | A1* | 12/2002 | Tamai et al. | 180/65.2 |
| 2010/0025131 | A1* | 2/2010 | Gloceri et al. | 180/65.28 |
| 2010/0222172 | A1* | 9/2010 | Ishii et al. | 475/83 |
| 2012/0286052 | A1 | 11/2012 | Atluri et al. | |
| 2013/0066492 | A1 | 3/2013 | Holmes et al. | |
| 2013/0296136 | A1* | 11/2013 | Doering et al. | 477/167 |
| 2013/0297113 | A1* | 11/2013 | Banker et al. | 701/22 |
| 2014/0228168 | A1* | 8/2014 | Kaufman et al. | 477/5 |

OTHER PUBLICATIONS

Rainer Knorr, Markus Gilch, Jürgen Auer and Christoph Wieser; entitled: Stabilization of the 12 V Onboard Power Supply—Ultracapacitors in Start-stop Systems; ATZelektronik worldwide Edition; http://www.atzonline.com/Article/12124/Stabilization-of-the-12-V-Onboard-Power-Supply-%E2%80%93-Ultracapacitors-in-Start-stop-Systems.html; dated May 2010; pp. 5.

* cited by examiner

| | A1 | A2 | A3 | S1 | S1-M | S2 | S2-M | BatSOC1 | BatSOC2 | TEMP |
|---|---|---|---|---|---|---|---|---|---|---|
| EO | 1 | 1 | 0 | 0 | X/O | 1 | X/O | PL11 | PL12 | T1 |
| ASTP | 1 | 1 | 0 | 1 | X/O | 0 | X/O | PL11 | PL12 | T2 |
| KS1 | 1 | 1 | 0 | 0 | X/O | 1 | X/O | PL11 | PL12 | T3 |
| KS2 | 1 | 1 | 0 | 1 | X/O | 0 | X/O | PL11 | PL12 | T4 |
| AS | 1 | 1 | 0 | 1 | X/O | 0 | X/O | PL21 | PL22 | T5 |
| TB I | 0 | 0 | 1 | 1 | X/O | 1 | X/O | PL31 | PL32 | T6 |
| TB II | 0 | 0 | 1 | 1 | X/O | 0 | X/O | PL31 | PL32 | T7 |
| R1 | 0 | 0 | 1 | 1 | X/O | 0 | X/O | PL41 | PL42 | T8 |
| R2 | 0 | 0 | 1 | 1 | X/O | 1 | L | SOC1>THSLD1 | SOC2<THSLD2 | T9 |
| R3 | 0 | 0 | 1 | 1 | X/O | 1 | L | SOC1>THSLD1 | SOC2>THSLD2 | T10 |

FIG. 8

HYBRID POWERTRAIN AND METHOD OF CONTROLLING SAME

TECHNICAL FIELD

The present teachings generally include a hybrid powertrain and a method of controlling a hybrid powertrain

BACKGROUND

Hybrid electric vehicles utilizing both an electric motor/generator and an internal combustion engine as power sources often have an onboard controller programmed to vary use of each of the engine and motor/generator during different driving conditions to achieve peak efficiency. One type of hybrid electric vehicle is referred to as a belt-alternator-starter hybrid vehicle. This type of vehicle may have a motor/generator operatively connected to an engine crankshaft by a belt and pulley system. The motor/generator in a belt-alternator-starter hybrid vehicle may be used to start the engine from a key start and may be recharged by the engine during regenerative braking.

SUMMARY

A hybrid powertrain includes an engine having a crankshaft, and a motor/generator. A belt drive train is operatively connectable to the crankshaft and to the motor/generator and a driving connection between the engine and the motor/generator can be established through the belt drive train. A gear train is operatively connected to the crankshaft separately from the belt drive train. A starter mechanism is controllable to selectively establish a driving connection to the crankshaft through the gear train. The hybrid powertrain includes a first energy storage device that is operable within a first range of operating voltage. A first switching device is controllable for selectively establishing electrical power flow between the first energy storage device and the motor/generator.

The hybrid powertrain includes a control system having at least one electronic controller operatively connected to and controlling the engine, the motor/generator, the selective coupling device, the starter mechanism, the first switching device, and at least one actuator activatable to establish the driving connection between the engine and the motor/generator via the gear train.

The at least one electronic controller is operable to execute a stored algorithm and control the hybrid powertrain in accordance with the stored algorithm to establish any one of multiple operating modes in at least partial dependence upon at least one of a parameter of the first energy storage device, a parameter of the control system, a parameter of the motor/generator, and a parameter of said at least one actuator. For example, the stored algorithm can control the hybrid powertrain based on a capacity to restart the engine of the first energy storage device, the at least one electronic controller, the motor/generator, the starter mechanism, and/or the at least one actuator. The capacity to restart the engine can include at least one of temperature of the first energy storage device, a state-of-charge of the first energy storage device, temperature of the control system, a state-of-health of the control system, temperature of the motor/generator, a state-of-health of motor/generator, a state of said at least one actuator and an actuation time of said at least one actuator.

In some embodiments, a second energy storage device and a second switching device can be controlled to establish additional operating modes. Moreover, the one or more electronic controllers can be configured in different embodiments to include an engine control module, a hybrid control processor, and a motor control processor. In such an embodiment, the hybrid control processor can execute a torque split algorithm and command torques of the engine and the motor/generator via the engine control module and the motor control processor, respectively. In other embodiments, the one or more electronic controllers include an engine control module and a motor control processor, with the engine control module carrying out the torque split algorithm.

The above features and advantages and other features and advantages of the present teachings are readily apparent from the following detailed description of the best modes for carrying out the present teachings when taken in connection with the accompanying drawings.

BRIEF DESCRIPTION OF THE DRAWINGS

FIG. 8 is a table showing various operating modes of the hybrid powertrain of FIG. 2 and indicating command logic for establishing the various operating modes.

DETAILED DESCRIPTION

Figure 1:
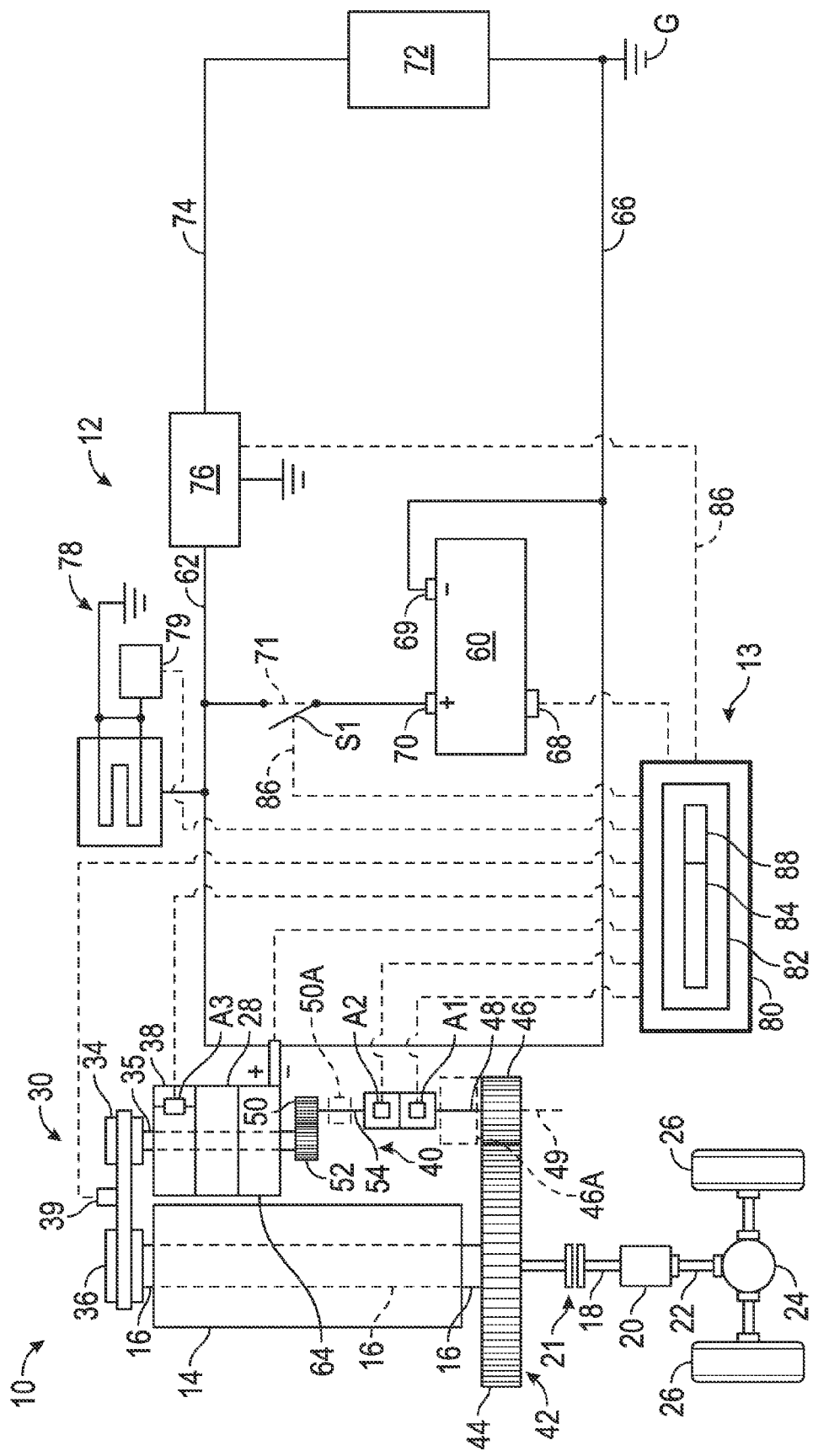
FIG. 1 is a schematic illustration of a portion of a first vehicle having a first embodiment of a hybrid powertrain.

Referring to the drawings, wherein like reference numbers refer to like components throughout the several views, various embodiments of vehicles with different hybrid powertrains are shown in FIGS. 1-5. As further described herein, each includes a control system that controls the hybrid powertrain to implement various operating modes, at least some of which are dependent upon one or more predetermined operating parameters of a first energy storage device, a parameter of the control system, a parameter of a motor/generator, and a parameter of at least one actuator. In some operating modes, the parameters may be those affecting the ability of the components to restart an engine of the hybrid powertrain.

More specifically, with reference to FIG. 1, a vehicle 10 has a hybrid powertrain 12 that includes a control system 13. The hybrid powertrain 12 includes an internal combustion engine 14 with an output member, such as a crankshaft 16, operatively connectable to an input member 18 of a transmission 20 by a selectively engageable clutch 21. The clutch 21 may be a normally closed clutch or a normally open clutch. The transmission 20 includes a gearing arrangement and clutches (not shown) through which torque flows from the input member 18 to an output member 22 and through a final drive 24 to vehicle wheels 26 to propel the vehicle 10. The wheels 26 shown may be front wheels or rear wheels. A second pair of wheels that is not shown may also be powered by the powertrain 12, or may be unpowered.

The powertrain 12 is a hybrid powertrain and more specifically, a fossil fuel-electric hybrid powertrain because, in addition to the engine 14 as a first power source powered by fossil fuel, such as gasoline or diesel fuel, an electric motor/generator 28 powered by stored electrical energy is available as a second power source. The motor/generator 28 is controllable to function as a motor or as a generator and is operatively connectable to the crankshaft 16 of the engine 14 via a belt drive train 30. The belt drive train 30 that includes a belt 32 that engages with a pulley 34 connectable to rotate with a motor shaft 35 of the motor/generator 28 and engagement with a pulley 36 connected to rotate with the crankshaft 16. When the pulley 34 is connected to rotate with the motor/generator 28, the belt drive train 30 establishes a driving connection between the motor/generator 28 and the crankshaft 16. The motor/generator 28 may be referred to as a belt-alternator-starter motor/generator. Alternatively, the belt drive train 30 may include a chain in lieu of the belt 32 and sprockets in lieu of the pulleys 34, 36. Both embodiments of the belt drive train 30 are referred to herein as a "belt drive train".

A selective coupling device 38 is operatively connected to the control system 13 and is controllable to selectively establish a driving connection between the crankshaft 16 and the motor/generator 28 through the belt drive 30. The selective coupling device 38 may be a normally engaged (i.e., normally closed) clutch that engages the motor shaft 35 to rotate commonly (i.e., together and in unison with) the pulley 34. An actuator A3 can be activated by a control signal from the control system 13 to selectively open or disengage the coupling device 38, so that the motor shaft 35 is then not in a driving connection with the crankshaft 16. The actuator A3 is characterized by a state at any given point in time, which is either an activated state or an inactivated state, which can also be referred to herein as an energized state or a deenergized state. The actuator A3 is also characterized by a respective actuation time, which is the amount of time required to move the actuator from a deactivated position to an activated position, or from the activated position to the deactivated position, and thus partially establish one of the operating modes of the hybrid powertrain 12.

Additionally, a variable tensioner system 39 may be used to adjust the tension between the belt 32 and the pulleys 34, 36. The tensioner system 39 can be electronically, hydraulically, or otherwise actuated. The control system 13 is operatively connected to the tensioner system 39 and can control the tensioner system 39 with a control signal. By controlling the tension, the torque transfer between the belt 32 and the pulleys 34, 36, and thus between the motor/generator 28 and the crankshaft 16 can be adjusted.

A starter mechanism 40 is controllable by the control system 13 to selectively establish a driving connection to the crankshaft 16 through a gear train 42 separately from any driving connection through the belt drive train 30. Specifically, the starter mechanism 40 includes a gear train 42. Two actuators A1 and A2 can be activated to establish a driving connection between the motor/generator 28 and the crankshaft 16. The actuators A1 and A2 can be linear actuators, such as electromechanical linear solenoids each of which are individually and separately actuatable when electronically activated with an electronic control signal received from the control system 13. Other potential configurations of the actuators A1, A2, by way of non-limiting example, can include an electric motor driving a ball-screw mechanism, a shape-memory alloy actuator, an electro-active polymer actuator, etc. For the shape-memory alloy actuator, selectively energizing the material, such as the alloy, can change the shape of the material which causes a gear 46 or 50 to move along an axis 49 as further described herein. For the electro-active polymer actuator, selectively energizing the material, such as the polymer, can change the shape of the material to move the gear 46 or 50 along the axis 49. Each of the actuators A1 and A2 is characterized by a state at any given point in time, which is either an activated state or an inactivated state, which can also be referred to herein as an energized state or a deenergized state. Each actuator A1 and A2 is also characterized by a respective actuation time, which is the amount of time required to move the actuator from a deactivated position to an activated position, or from the activated position to the deactivated position, and thus partially establish one of the operating modes of the hybrid powertrain 12.

The gear train 42 includes an external gear 44, such as a ring gear on a flywheel that rotates with the crankshaft 16. A pinion gear 46 is supported to rotate with a shaft 48, and is movable with the shaft 48 along as axis 49 of the shaft 48 when the actuator A1 is activated. Specifically, the pinion gear 46 is movable with the shaft 48 between an engaged or coupled position shown, in which the pinion gear 46 meshes with the external gear 44, and an uncoupled or disengaged position, 46A shown in phantom, in which the shaft 48 and pinion gear 46 move so that the pinion gear 46 is not meshing with the external gear 44. The pinion gear 46 is referred to as a first gear of the gear train 42, and the external gear 44 is referred to as a second gear of the gear train 40.

The gear train 42 also includes a third gear 50 and a fourth gear 52. The third gear 50 is supported to rotate with a shaft 54, and meshes with the fourth gear 52 when the third gear 50 is in an engaged or coupled position shown. The third gear 50 is movable linearly with the shaft 54 along the same axis 49 as shaft 48 when the actuator A2 is activated. The third gear 50 is movable between the engaged position and an uncoupled or disengaged position 50A in which the third gear 50 is not meshing with the fourth gear 52. The fourth gear 52 rotates with the motor shaft 35. Torque is thus transferred through the gear train 42 between the electric motor/generator 28 and the crankshaft 16 through the gear train 42 only when both actuators A1 and A2 are activated, so that gears 46 and 50 are both in the engaged positions.

The hybrid powertrain 12 includes only a single energy storage device (ESS1) 60, also referred to as a first energy storage device, that can store and provide electrical energy along a first voltage bus 62, referred to as a high voltage bus, at a voltage compatible with that required for powering the motor/generator 28. Specifically, the ESS1 60 may be a battery or battery module rated for a relatively high nominal voltage, such as, by way of non-limiting example, 24 VDC. The ESS1 60 is operable within a first range of operating voltage that includes the nominal voltage. The specific operating voltage of the ESS1 60 within the first range of operating voltage at any point in time is dependent in part on a state-of-charge and a temperature of the ESS1 60.

The motor/generator 28 may have a stator with multi-phase windings requiring alternating current. A motor power inverter module (MPIM) 64 can be controlled by the control system 13 and configured to convert between DC voltage at the bus 62 and three-phase power required by and generated by the motor/generator 28. The motor/generator 28 and ESS1

60 are grounded to a common ground G via a ground connection 66. The ESS1 60 has a battery management system (BMS1) 68 that includes a variety of sensors and is in operative communication with the control system 13 to provide operating data from which the control system 13 can determine the state-of-charge and temperature of the ESS1 60.

A negative terminal 69 of the ESS1 60 is connected to ground G. A positive terminal 70 is only selectively connected to the high voltage bus 62. Specifically, a switching device S1 is operatively connected to the control system 13 and is controllable by a control signal from the control system 13 to establish a closed or ON position, shown in phantom as 71, or an open or OFF position shown in solid line. In the ON position, switching device S1 establishes electrical communication between the ESS1 60 and the motor/generator 28 via the high voltage bus 62 and the MPIM 64. The switching device S1 can be a unidirectional or bidirectional blocking switch, or a solid-state switch. In some embodiments, the switching device S1 can also be controlled to establish a linear mode of operation in which the ESS1 60 is in electrical communication with the motor/generator 28, but the voltage from the ESS1 60 is modified (i.e., reduced) depending on a position of the switching device S1 between closed and open. The switching device S1 allows the hybrid powertrain 12 to be controlled so that there is no continuous connection between any electrical energy storage device and the motor/generator 28.

An auxiliary electrical system 72 is operatively connected to a second voltage bus 74 and is grounded to the ground G. The auxiliary electrical system 72 may include one or more vehicle accessory devices installed on the vehicle 10 that are configured to operate within a range of voltages different than or the same as the voltage supplied on the bus 62 by the ESS1 60 or by the motor/generator 28. For example, the auxiliary electrical system 72 can include headlights, HVAC devices, auxiliary motors, entertainment system components, etc. A selective connection between the bus 62, and the bus 74 and auxiliary electrical system 72 can be established by a selective connecting device, such as a DC-DC converter 76 that is configured to step down voltage from the bus 62 to the bus 74. For example, the bus 74 can be a 12V bus, in which case the optional DC-DC converter is used to provide stable voltage to all or select electrical loads of the accessory devices of the auxiliary electrical system 72 if the voltage level of the ESS1 60 provided at the bus 62 deviates significantly from that of a standard 12V bus (e.g., <10V or >16V). Alternatively another switching device may be used as a selective connecting device in place of the DC-DC converter 76. The DC-DC converter 76 (or switching device) is operatively connected to the control system 13 and controlled according to the loads of the auxiliary electrical system 72 and other vehicle operating parameters provided to the control system 13. Still further, the DC-DC converter 76 may be eliminated if the electrical loads of the accessory devices in the auxiliary electrical system 72 are within the range of voltages provided on the bus 62.

An auxiliary solar power system 78 can be installed on the vehicle 10. The auxiliary solar power system 78 is in operative communication with the bus 62, and with the control system 13. The auxiliary solar power system 78 can provide electrical energy to the bus 62, for assisting with electrical power requirements of the hybrid powertrain 12. The auxiliary solar power system 78 includes photovoltaic sources such as one or a plurality of interconnected individual solar cells, solar laminate film, solar cured glass, surface coatings, and/or other photovoltaic devices. The control system 13 can determine the electrical power available from the auxiliary solar power system 78 and photovoltaic (solar) power source(s). Photovoltaic sources may include one or a plurality of interconnected individual solar cells, solar laminate film, solar cured glass, surface coatings, and/or other photovoltaic devices. The auxiliary solar power system 78 with photovoltaic sources generating electricity may be mounted on any surface of vehicle 10 that may potentially be incident to the sun. The maximum amount of energy generated or power outputted by the auxiliary solar power system 78 may be a predetermined amount based on the amount of solar irradiance incident on the photovoltaic sources. The solar irradiance may be measured by a photovoltaic source or independently using one of several types of stand-alone pyranometers such as thermopile-based, silicon photodiode-based, or other type of measurement device.

The auxiliary solar power system 78 may be electrically connected to provide electrical energy to the bus 62, such as to store energy generated thereby in ESS1 60 when the switching device S1 is controlled to establish an electrical connection between the bus 62 and the ESS1 60. The auxiliary solar power system 78 may also include an integral power control unit, such as an integrated voltage modifying device 79 that can be a DC-DC converter that is controlled to convert the voltage provided by the photovoltaic sources to the voltage range of the bus 62 and to selectively connect the auxiliary solar power system 78 with the bus 62.

The control system 13 is operable to control the hybrid powertrain 12 to establish various operating modes. More specifically, the control system 13 includes at least one electronic controller 80 that includes at least one processor 82 that executes one or more stored algorithms 84 based on various vehicle and powertrain inputs, and generates control signals in accordance with the stored algorithms that establish multiple operating modes. The electronic controller 80 may be configured as a single or distributed control device that is electrically connected to or otherwise placed in hard-wired or wireless communication with each of the engine 14, the transmission 20, the wheels 26, the motor/generator 28 and the MPIM 64 thereof, the actuators A1, A2, A3, the ESS1 60, the switching device S1, the auxiliary solar power system 78, the DC-DC converter 76, and the auxiliary electrical system 72 via control channels 86, some of which are referenced in FIG. 1. The control channels 86 may include any required transfer conductors, for instance a hard-wired or wireless control link(s) or path(s) suitable for transmitting and receiving the necessary electrical control signals for proper power flow control and coordination aboard the vehicle 10.

The electronic controller 80 includes one or more control modules, with one or more processors 82 and tangible, non-transitory memory 88, e.g., read only memory (ROM), whether optical, magnetic, flash, or otherwise. The electronic controller 80 may also include sufficient amounts of random access memory (RAM), electrically-erasable programmable read only memory (EEPROM), and the like, as well as a high-speed clock, analog-to-digital (A/D) and digital-to-analog (D/A) circuitry, and input/output circuitry and devices (I/O), as well as appropriate signal conditioning and buffer circuitry.

The electronic controller 80 can be a host machine or distributed system, e.g., a computer such as a digital computer or microcomputer, acting as a vehicle control module, and/or as a proportional-integral-derivative (PID) controller device having a processor, and, as the memory 88, tangible, non-transitory computer-readable memory such as read-only memory (ROM) or flash memory. Therefore, the controller 80 can include all software, hardware, memory 88, algorithms, connections, sensors, etc., necessary to monitor and control the hybrid powertrain 12. As such, one or more control methods executed by the controller 80 can be embodied as software or firmware associated with the controller 80. It is to be appreciated that the controller 80 can also include any device capable of analyzing data from various sensors, comparing data, and making decisions required to control the hybrid powertrain 12.

Figure 6:
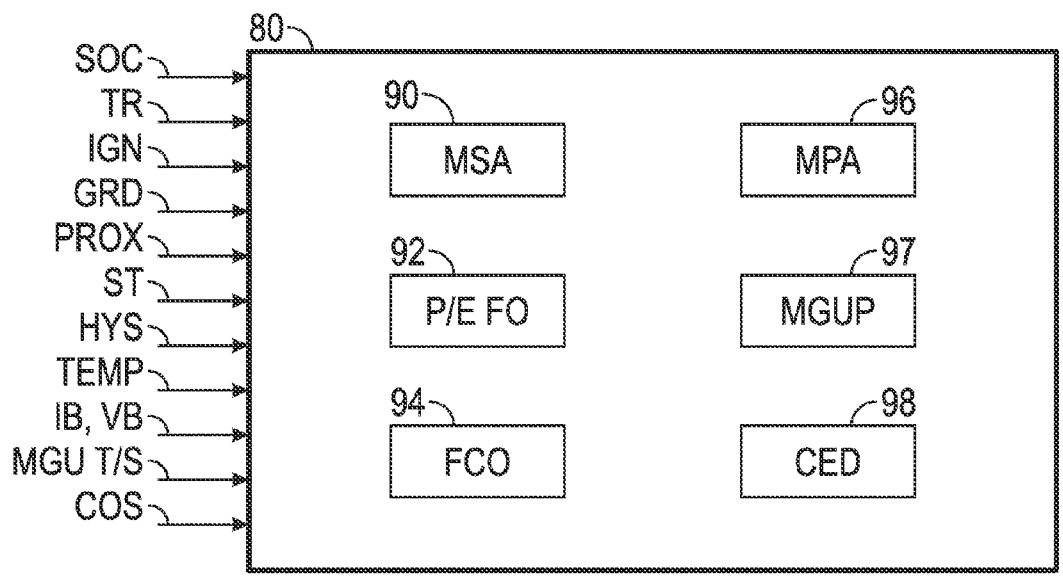
FIG. 6 is a schematic illustration of a control system with various propulsion control algorithms for any of the hybrid powertrains of FIGS. 1-5.

Various embodiments of control systems 13, 13A, 13B that can be included in the powertrain 12, or additional powertrains 112, 212, 313 or 412 shown and described herein, are similar to those shown in FIGS. 9-12. One schematic illustration of the electronic controller 80 is depicted in FIG. 6, showing various functional algorithms stored on and executed by the one or more processors of the one or more electronic control modules. For example, the controller 80 has one or more control modules or processors that carry out multiple stored algorithms to determine and implement control and optimization of vehicle propulsion via the powertrain 12, or additional powertrains 112, 212, 313 or 412 shown and described herein. In the embodiment shown, the algorithms include a mode selection algorithm (MSA) 90 executed to determine or select one of many available operating modes based at least in part on various vehicle operating parameters, including operating parameters of the powertrain 12. The logic for one the mode selection algorithm 90 is shown and described in further detail in FIG. 8. Other algorithms executed by the control system 13 include a power/energy flow optimizer (P/E FO) 92 that considers power losses associated with utilizing the motor/generator 28 and the ESS1 60, a fuel cut-off mode control algorithm (FCO) 94 that determines control signals for cutting fuel to the engine 14 and allowing the crankshaft 16 to freewheel, a multiplexing algorithm (MPA) 96 that enables the motor/generator 28 to provide multiple output voltages, a motor/generator preparation algorithm (MGUP) 97 that prepares the motor/generator 28 for hybrid operating modes to be commanded, and a clutch engagement/disengagement algorithm (CED) 98 that includes and implements logic for control of clutches or other torque-transmitting devices (not shown) in the transmission 20, and for control of the clutch 21.

Various vehicle operating conditions are provided as input signals to the electronic controller 80. Some of the input signals are indicated in FIG. 6. For example, FIG. 6 shows that a state-of-charge (SOC) of any energy storage device, such as ESS1 60 of FIG. 1 is provided to the controller 80. Wake up signals to the controller 80 upon key insertion or other actuation of the vehicle ignition, and engine ignition position signals IGN such as crank or run can be provided as input to the controller 80. A torque request TR made by a vehicle operator, such as by accelerator pedal or brake pedal is provided as an input operating signal. The current grade GRD on which the vehicle 10 is travelling, as determined by various sensors or by a global positioning system, may be determined and provided as input operating condition. For some vehicles, proximity to other vehicles PROX may be provided as input operating signals. Additional inputs can include predetermined shift times ST of the transmission 20, and hysteresis bands HYS, i.e., permitted operating ranges of various powertrain components, such as a range of state-of-charge of the ESS1 60. The temperatures TEMP of various components including any energy storage devices, such as the temperature of the ESS1 60 can be an input signal to the controller 80. Current IB and voltage VB of any energy storage devices, such as ESS1 60, can be an input. An estimated or measured torque and/or speed MGU T/S of the motor/generator 28 can be an input to the controller 80. The state and/or the activation time of any of the actuators A1, A2, A3 can also be input signals to the controller 80. Additionally, any other current operating parameters or state (COS) of any other components of the vehicle 10, including components of the hybrid powertrain 12, can be input signals to the controller 80, such as the state and/or actuation speed of any of the actuators A1, A2, or A3. The other current operating parameters or states (COS) can include a state of health of the motor/generator 28 and/or of control system 13 or MPIM 64 or other components. The states of health may be indicated by diagnostics indicating faults that may allow the respective component to operate in a reduced capacity. such faults or diagnostics could affect the capacity of the component to assist in restarting the engine 14, and so can be considered by the control system 13 in establishing an operating mode.

The various operating modes of the hybrid powertrain 12, as established by the control system 13, include an engine ignition off (EO) mode, in which the engine 14 is off, none of the actuators A1, A2, A3 are activated, the motor/generator 28 is not powered, and the switching device S1 is open. When a key is inserted in the ignition or the ignition is otherwise closed, prior to a key start, the control system 13 initializes the system in a system initialization mode (SYS INIT) mode that activates the actuators A1, A2 and closes the switching device S1 and controls the DC-DC converter 76. During this mode, the ESS1 60 can provide electrical energy to power the auxiliary electrical system 72.

When the key is turned or the ignition is otherwise actuated, the control system 13 establishes a key start mode similar to KS2 of FIG. 8 by activating the actuators A1, A2, A3, with the switching device S1 in the closed position, and controlling the motor/generator 28 to function as a motor using energy from the ESS1 60 if the state-of-charge of the ESS1 60 is at least a first predetermined level, and the temperature of the ESS1 60 is at least a first predetermined temperature and if the other current operating parameters or states (COS) considered are satisfied. The motor/generator 28 drives the crankshaft 16 via the starter mechanism 40 to start the engine 14. Optionally, power from the auxiliary solar power system 78 can be used as well.

With the engine 14 started, the actuators A1, A2 can be deactivated to prevent a driving connection to the crankshaft 16 through the starting mechanism 40. The actuator A3 can be controlled to disconnect the motor/generator 28 from the pulley 34, and the engine 14 can be on in an engine-only operating mode of the powertrain 12. Alternatively, the actuator A3 can be controlled so that torque is transferred from the shaft 35 to the pulley 34 and the motor/generator 28 is controlled to function as a motor to assist the engine 14, using energy from the ESS1 60 in a torque boost mode similar to TB II of FIG. 8. During engine operation, with actuator A3 controlled so that torque is transferred from the shaft 35 to the pulley 34 and the switching device S1 closed, if the state-of-charge of the ESS1 60 is below a predetermined level, and the torque demand of the powertrain 12 is met sufficiently by the engine 14 and if the other current operating parameters or states (COS) considered are satisfied, the motor/generator 28 can be controlled to function as a generator in a generating mode, using power from the engine 14 to accomplish opportunity charging of the ESS1 60. Additionally, in a regenerative braking mode similar to R1 of FIG. 8, the motor/generator 28 is controlled to operate as a generator to slow the crankshaft 16 while recharging the ESS1 60, if predetermined state-of-charge and temperature levels of the ESS1 60 are satisfied and if the other current operating parameters or states (COS) considered are satisfied. The state-of-charge and temperature level requirements for the regenerative braking mode can be different than those required for the torque boost mode.

Once the vehicle 10 has slowed to a vehicle speed less than a predetermined threshold, an auto-stop mode similar to ASTP of FIG. 8 can be established by the control system 13 for a stop of relatively short duration, such as at a stop light, if the state-of-charge of the ESS1 60 and the temperature of the ESS1 60 meet predetermined levels, which can be the same predetermined levels as required for the key start mode, and if the other current operating parameters or states (COS) considered are satisfied. In the auto-stop mode, the engine 14 is off (i.e., fuel is cut off), and the switching device S1 is closed so that ESS1 60 can power the vehicle accessory devices via the auxiliary electrical system 72. The actuators A1 and A2 are also activated, so that the motor/generator 28 can quickly drive the crankshaft 16 through the starter mechanism 40 when the control system 13 transitions the powertrain 12 to an auto-start mode similar to AST of FIG. 8.

Once operating conditions indicate engine start is desired, such as by release of the vehicle brake pedal or depression of the vehicle accelerator pedal following an auto-stop, the control system 13 establishes the AST mode by controlling the motor/generator 28 as a motor to turn the crankshaft 16 through the starting mechanism 40 if the state-of-charge of the ESS1 60 and temperature of the ESS1 60 meet predetermined levels, such as a second predetermined state-of-charge level and at least a second predetermined temperature level and if the other current operating parameters or states (COS) considered, such as those affecting capacity of various components to restart the engine 14, are satisfied. Once the engine 14 is started, the control system 13 then establishes the engine-only operating mode, the torque boost mode, or the regenerative braking mode as needed to meet torque demand and to satisfy state-of-charge requirements of the ESS1 60. When the vehicle speed drops below the predetermined threshold and if the engine ignition is off, then the control system 13 returns the hybrid powertrain 12 to engine-off mode.

Figure 2:
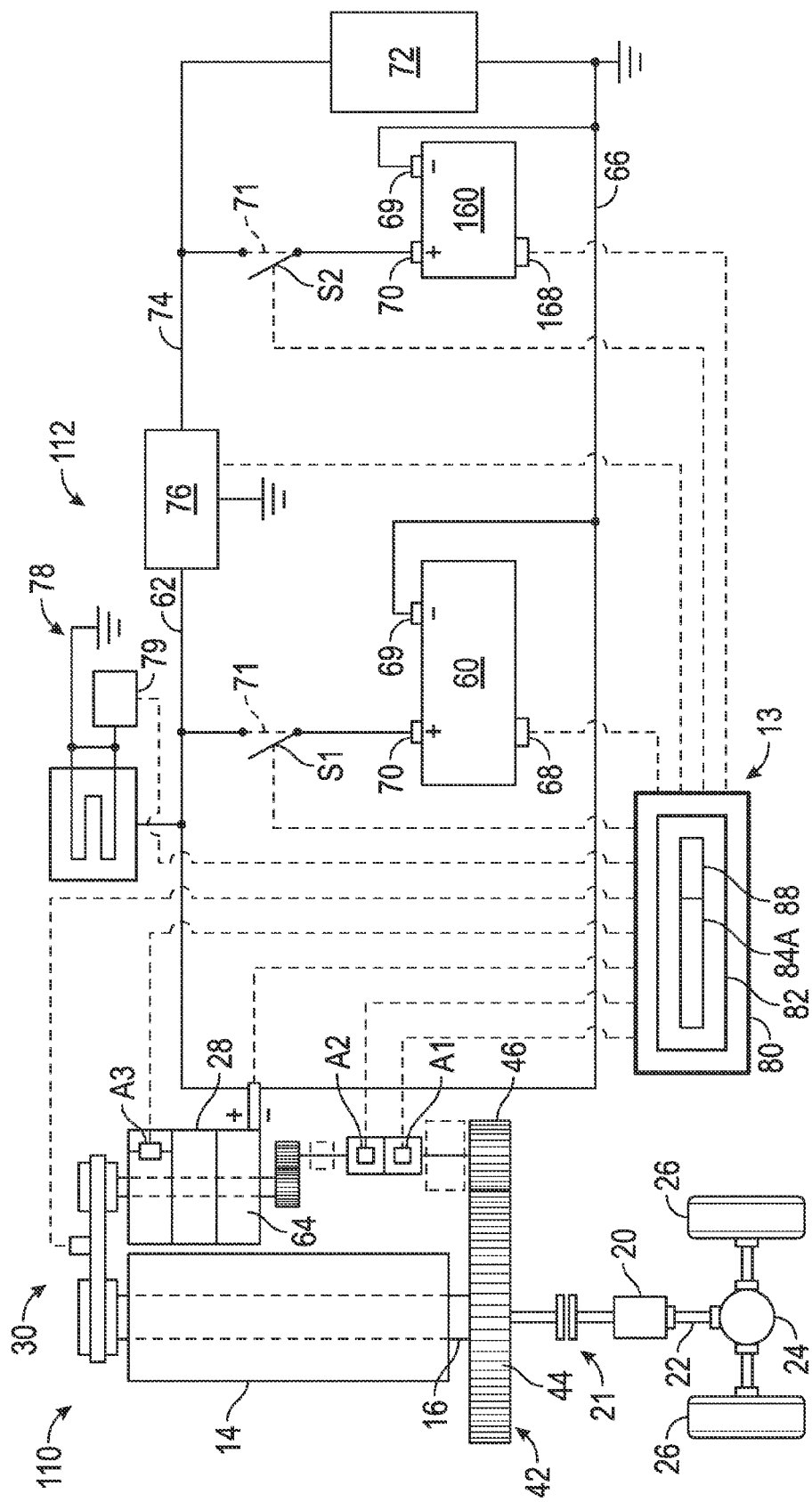
FIG. 2 is a schematic illustration of a portion of a second vehicle having a second embodiment of a hybrid powertrain.

FIG. 2 shows an alternative embodiment of vehicle 110 with a hybrid powertrain 112 that has many of the same components as the vehicle 10 and powertrain 12. Only those components indicated with difference reference numbers are different from the components of FIG. 1. Specifically, the hybrid powertrain 112 includes a second energy storage device ESS2 160 operatively connected to the control system 13 via a battery management system BMS2 168. The ESS2 160 can be rated for a relatively low nominal voltage, such as, by way of non-limiting example, 12 VDC. The ESS2 160 is operable within a second range of operating voltage that includes the nominal voltage. The second range of operating voltage may be lower than the first range of operating voltage of the ESS1 60. The specific operating voltage of the ESS2 160 within the second range of operating voltage at any point in time is dependent in part on a state-of-charge and a temperature of the ESS2 160.

The powertrain 112 also includes a second switching device S2 that is controllable by a control signal from the control system 13 to establish a closed or ON position, shown in phantom as 71, or an open or OFF position shown. The switching device S2 can be a unidirectional or bidirectional blocking switch, or a solid-state switch. In some embodiments, the switching device S2 can also be controlled to establish a linear mode of operation.

In the ON position, the switching device S2 establishes electrical power flow between the positive terminal 70 of the ESS2 160 and the motor/generator 28 via the bus 62 and the DC-DC converter 76 is operating to provide a step in voltage between the buses 62 and 74. In the ON position, the switching device S2 also establishes electrical power flow between the positive terminal 70 of the ESS2 160 and the auxiliary electrical system 72 via the bus 74. Electrical power flow between ESS2 160 and the motor/generator 28 is thus in parallel with electrical power flow between the motor/generator 28 and the auxiliary electrical system 72. The ESS2 160 is grounded at the negative terminal 69 to ground connection 66.

Figure 7:
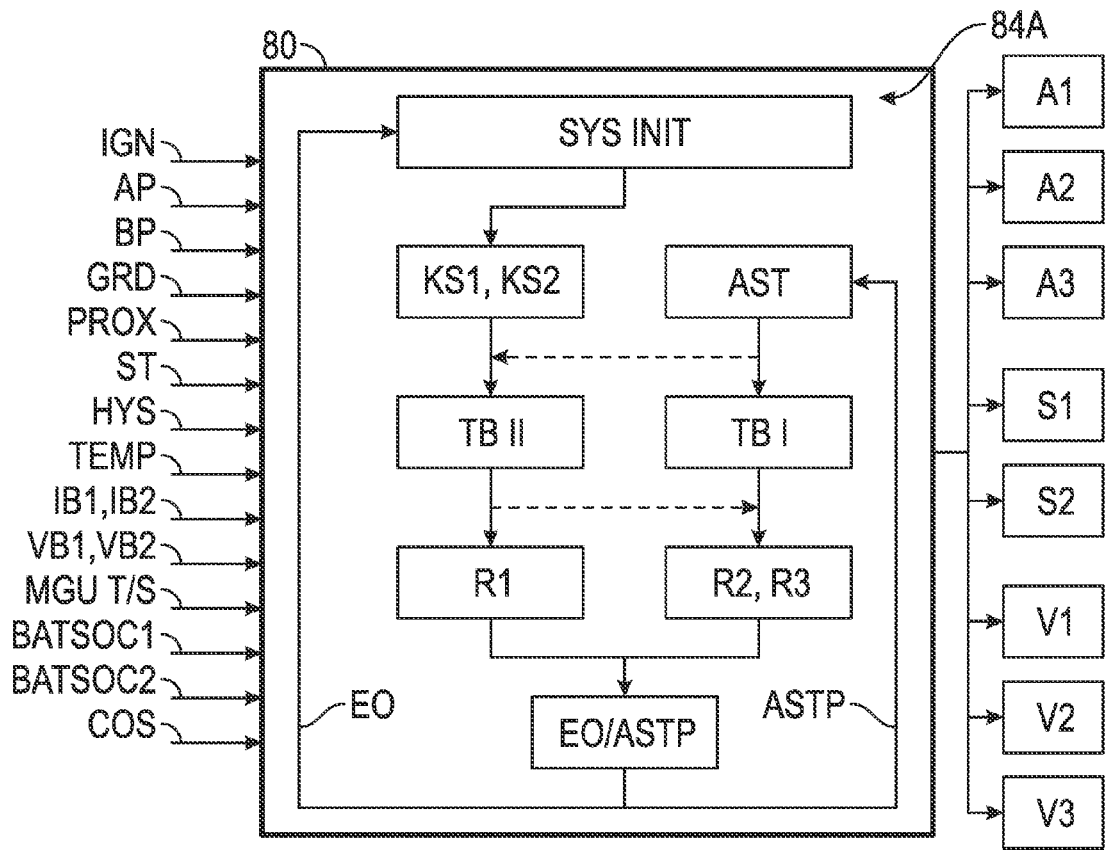
FIG. 7 is a schematic diagram of a mode control scheme of the electronic controller of FIG. 6.

One or more stored algorithms 84A executed by the processor 82 of the electronic controller 80 enable the control system 13 to establish various different operating modes of the hybrid powertrain 112. The input signals and output control signals to the controller 80 and the control scheme of the algorithms implemented by the controller 80 are schematically depicted in FIG. 7. The various operating modes and the corresponding states of the components of the hybrid powertrain 112 are indicated in the mode command logic table of FIG. 8.

FIG. 7 shows the various input signals to the controller 80. Many of the input signals are the same as those described with respect to FIG. 6. The torque request signal TR of FIG. 6 is indicated as two separate signals in FIG. 7, including an accelerator pedal input signal AP from an accelerator pedal (not shown) and a brake pedal input signal BP from a brake pedal (not shown). The current output IB1 of ESS1 60 and the current output IB2 of ESS2 160 are input signals, as is the voltage output VB1 of ESS1 60 and the voltage output VB2 of ESS2 160. The state-of-charge of each of ESS1 60 and ESS2 160 are input signals BATSOC1 and BATSOC2, respectively. Command signals to the actuators A1, A2, A3, and to the switching devices S1, S2, as well as voltage set points V1, V2, and V3, and control signals to the motor/generator 28 are among the control signals output from the electronic controller 80 to achieve the various operating modes. The voltage set points V1, V2, V3 represent different possible voltages commanded to different components of the powertrains 12, 112, 212, 312, or 412. For example, a voltage set point V1 can be commanded of the MPIM for the voltage to be supplied to or by the motor/generator 28. Voltage set point V2 can be a voltage level commanded to the ESS1 60. Voltage set point V3 can be a voltage level commanded to the ESS2 160. Additional voltage set points can be commanded of the DC-DC converter 76, indicating a voltage to which the DC-DC converter 76 should convert voltage depending on whether either or both of ESS1 60 and ESS2 160 are being charged or are supplying charge. An additional voltage set point can be commanded of the auxiliary solar power system 78. Control signals commanding corresponding current set points can also be commanded by the controller 80 of the components receiving voltage set point commands.

Referring now to FIG. 8, the various operating modes include the engine ignition off (EO) mode, the engine off auto-stop (ASTP) mode, a first key start mode (KS1), a second key start mode (KS2), an auto-start mode (AST), a first torque boost mode (TS1), a second torque boost mode (TS2), a first regenerative braking mode (R1), a second regenerative braking mode (R2), and a third regenerative braking mode (R3). As indicated in FIG. 8, predetermined parameters of ESS1 and of ESS2 are considered in the algorithm 84A executed by the controller 80. For example, the state-of-charge of ESS1 60 (BATSOC1), the state-of-charge of ESS2 160 (BATSOC2), the temperature (TEMP) and/or of ESS2 160 are considered by the controller 80, and establishment of the various operating modes is in part dependent upon BATSOC1, BATSOC2, and TEMP of ESS1 and ESS2. The state-of-charge levels for ESS1 60 are indicated as PL11, PL21, PL31, and PL41, but do not indicate an order of descending or ascending numerical value. The state-of-charge levels for ESS2 160 are indicated as PL12, PL22, PL32, and PL42, but do not indicate an order of descending or ascending numerical value. The state-of-charge levels in FIG. 8 can be minimum levels, maximum levels, or intermediate level. A minimum state-of-charge for ESS1 60 of THSLD1 is indicated for the second regenerative braking mode R2 and can be have the same or different numerical value as in the third regenerative braking mode R3. A threshold state-of-charge THSLD2 establishes a maximum for ESS2 160 in the second regenerative braking mode R2, and a minimum for ESS2 160 in the third regenerative braking mode R3, and can have the same or different numerical value in R2 and R3.

Additionally, predetermined temperature levels TEMP can be considered for ESS1 60 and for ESS2 160 as required temperatures for establishing the respective operating modes The temperature levels T1, T2, T3, T4, T5, T6, T7, T8, T9, and T10 of FIG. 8 do not indicate an order of descending or ascending numerical value. Additionally, at least some of the temperature levels T1, T2, T3, T4, T5, T6, T7, T8, T9, and T10 can have the same numerical value. The temperature levels T1-T10 can be minimum levels, maximum levels, or intermediate levels required of the ESS1 60 or ESS2 160.

In FIG. 8, a "1" indicates an activated, energized, or engaged state for any of the actuators A1, A2, A3. In FIG. 8, a "0" indicates a deactivated, deenergized, or not engaged state for any of the actuators A1, A2, A3. If the coupling device 38 is normally closed, than a "1" with respect to A3 in FIG. 8 indicates that A3 is not activated, and a "0" indicates that A3 is activated (so that coupling device 38 opens). With respect to the switching devices S1, S2, a "1" indicates that the switching device is controlled to establish an electrical connection, and a "0" indicates that the switching device is controlled to prevent an electrical connection. FIG. 8 also indicated the mode of operation S1-M of the switching device S1, and the mode of operation S2-M of the switching devices S2. The switching devices S1 and S2 are operated either in an ON/OFF mode, in which the switching device S1 or S2 is closed in the ON mode and open in the OFF mode, or in a linear operating mode in which the switching device.

The mode control scheme established by the algorithm 84A shown in FIG. 7 indicates that when the powertrain 112 is in an engine ignition off mode EO, and the control system 13 is initialized when a key is inserted in the ignition or the ignition is otherwise actuate, to establish a system initialization SYS INIT mode in which the actuators A1, A2 are activated, the switching device S2 is closed if the state-of-charge requirements PL11 and PL12, as well as temperature requirements T1, and/or any other current operating parameters or states (COS) considered are satisfied. The powertrain 112 is thus prepared for starting the engine 14 in the first key start KS1 mode when the ignition is closed. Alternatively, the second key start mode KS2 could instead be established by closing switching device S1 instead of switching device S2, such as when BATSOC1, BATSOC2, and TEMP and/or any other current operating parameters or states (COS) considered are satisfied for the predetermined levels required for the second key start mode KS2 but not for the first key start mode KS1. Following either of the key start modes KS1 or KS2, the vehicle operating conditions as indicated by the input signals to the controller 80 will most likely result in the establishment of the second torque boost mode TB II, in which actuator A3 is controlled so that coupling device 38 is engaged and the first switching device S1 is closed so that the motor/generator 28 can receive energy from ESS1 60 and operate as a motor to assist the engine 14 in providing tractive torque to the vehicle wheels 26. Alternatively, after either key start mode KS1 or KS2, or following an auto-start mode AST, the control system 13 can establish the first torque boost mode TB1 in which actuator A3 is controlled so that coupling device 38 is engaged and both switching devices S1 and S2 are closed so that energy from both ESS1 60 and ESS2 160 can be used in powering the motor/generator 28 as a motor to assist the engine 14 in satisfying vehicle torque demands. Once the vehicle reaches desired operating speeds, the motor/generator 28 can be operated as a generator with actuator A3 controlled so that coupling device 38 is engaged and either or both switching devices S1, S2 closed to allow recharging of ESS1 60 or ESS2 160 in a generating mode.

During vehicle travel in either of the torque boost modes TB1 or TBII, or in the corresponding generating modes, if input signals to the controller 80 indicate that slowing of the crankshaft 16 is desired, any of three different regenerative braking modes R1, R2, or R3 can be established depending upon predetermined conditions BATSCO1, BATSOC2, and TEMP of ESS1 60 and ESS2 160 as indicated in FIG. 8 and/or the other current operating parameters or states (COS) considered. In the regenerative braking modes R1, R2, R3, there is no driving connection to the crankshaft 16 through the starter mechanism 40.

If input signals to the controller 80 indicate that the vehicle 110 has slowed to less than a predetermined speed, then the auto-stop mode ASTP can be established by activating both A1 and A2 and closing switching device S1. During the auto-stop mode ASTP, the auxiliary electrical system 72 can be powered with energy from ESS1 60. With actuators A1 and A2 activated, the powertrain 112 is prepared to establish an auto-start mode AST when vehicle torque demand is indicated by brake pedal input signal BP or accelerator pedal input signal BP. In the auto-start mode AST, the motor/generator 28 is controlled to function as a motor to provide torque to the crankshaft 16 to start the engine 14. Alternatively, if after the vehicle slows below the predetermined speed, the ignition is turned off, the control system 13 again establishes the engine ignition off EO mode.

Accordingly, with respect to the vehicle 110 and powertrain 112, the operating modes of FIG. 8 illustrate that the switching device S2 is normally closed to power the vehicle loads when the engine 14 is off (such as in EO mode), and may be opened while the loads of the auxiliary electrical system 72 are supplied by the motor/generator 28 during regenerative braking mode R1, or are supplied by ESS1 60. Switching device S2 may be closed during generating mode operation of motor/generator 28 (i.e., when switching device S1 is closed and actuator A3 is controlled to close coupling device 38) to restore the charge lost during an engine-off period and to support vehicle parasitic loads (i.e., loads of the auxiliary electrical system 72) under key-off condition (in the engine ignition off EO mode).

The switching device S1 is preferably closed during engine torque assist and regenerative braking modes (TB I, TB II, R1, R2, R3) when the state-of-charge of ESS1 60 is within a predetermined range meeting the BATSOC1 requirements of FIG. 8, or when the auxiliary electrical system 72 loads are supplied by ESS1 60.

The switching device S1 is preferably opened during cold start (the first key start mode KS1) or to prevent overcharging or over discharging of ESS1 60, in which case an engine-only mode, not indicated in FIG. 8 is established. Additionally, the switching devices S1 and S2 may both be opened if the motor/generator 28 alone is operated in a generating mode with A3 controlled so that the coupling device 38 is engaged and the engine 14 is on, to supply energy for the auxiliary electrical device 72 loads directly. The switching devices S1 and S2 can both be closed when their voltages are matched such as by operation in the linear mode, and used to provide enhanced capability during cold cranking (i.e., an additional key start mode) (with the DC-DC converter 76 bypassed or a switch used in place of the DC-DC converter 76 closed) or to maximize energy recuperation during the second and third regenerative braking modes R2, R3.

Figure 3:
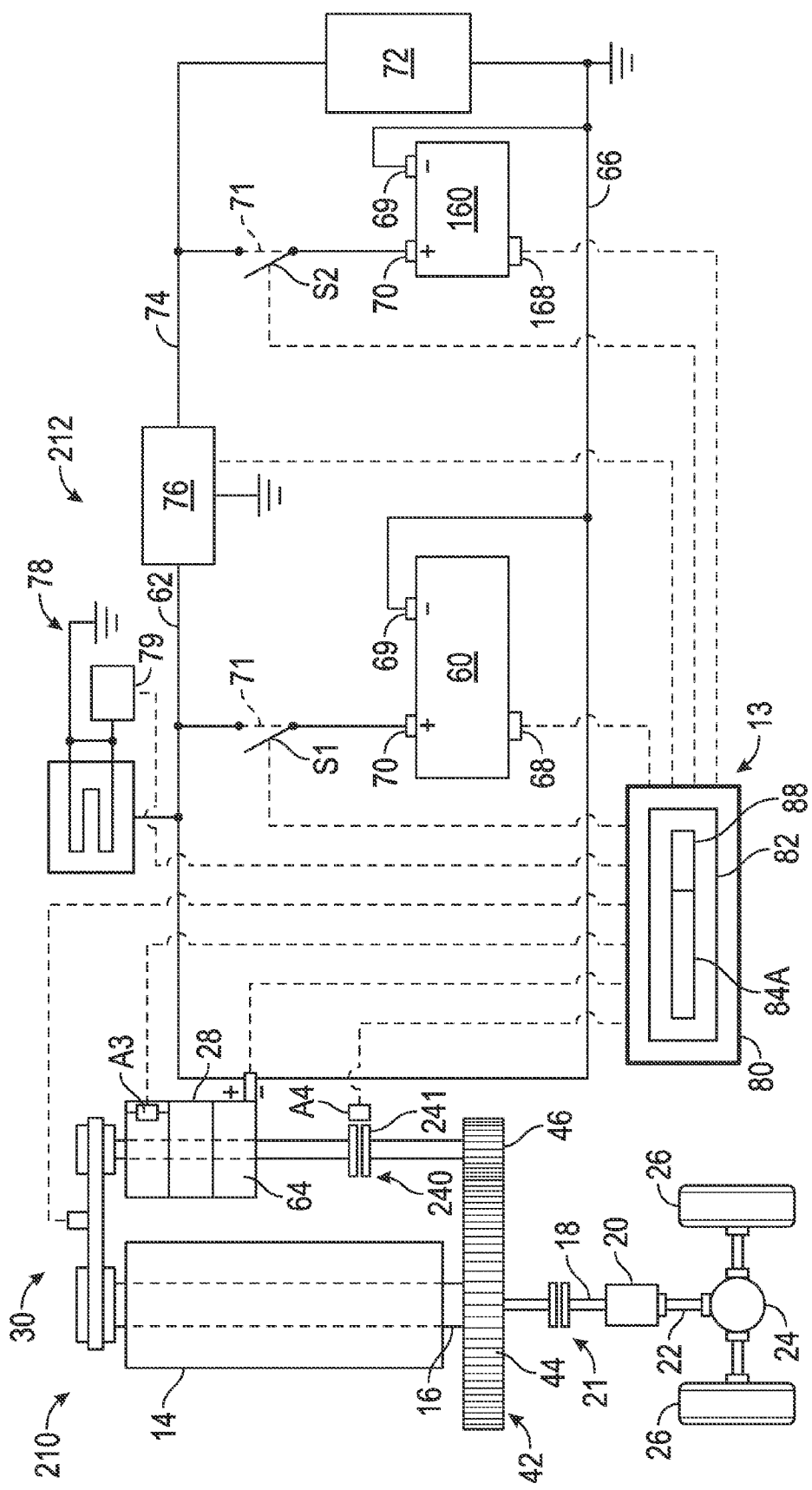
FIG. 3 is a schematic illustration of a portion of a third vehicle having a third embodiment of a hybrid powertrain.

Referring now to FIG. 3 a vehicle 210 with a hybrid powertrain 212 is alike in all aspects to the vehicle 110 and hybrid powertrain 112 of FIG. 2, except that the starter mechanism 40 with the gear train 42 and actuators A1, A2 are replaced by a starter mechanism 240 that is single selectively engageable clutch 241 and the gear train 42. The clutch 241 is selectively engaged by movement of an actuator A4 when the actuator A4 is activated. The hybrid powertrain 212 is controllable in the same manner as hybrid powertrain 212 to establish various operating mode such as those listed in FIG. 8. In each operating mode in which actuators A1 and A2 are activated in the powertrain 112, actuator A4 is instead activated by the algorithm 84A of the control system 13 of the powertrain 212.

Figure 4:
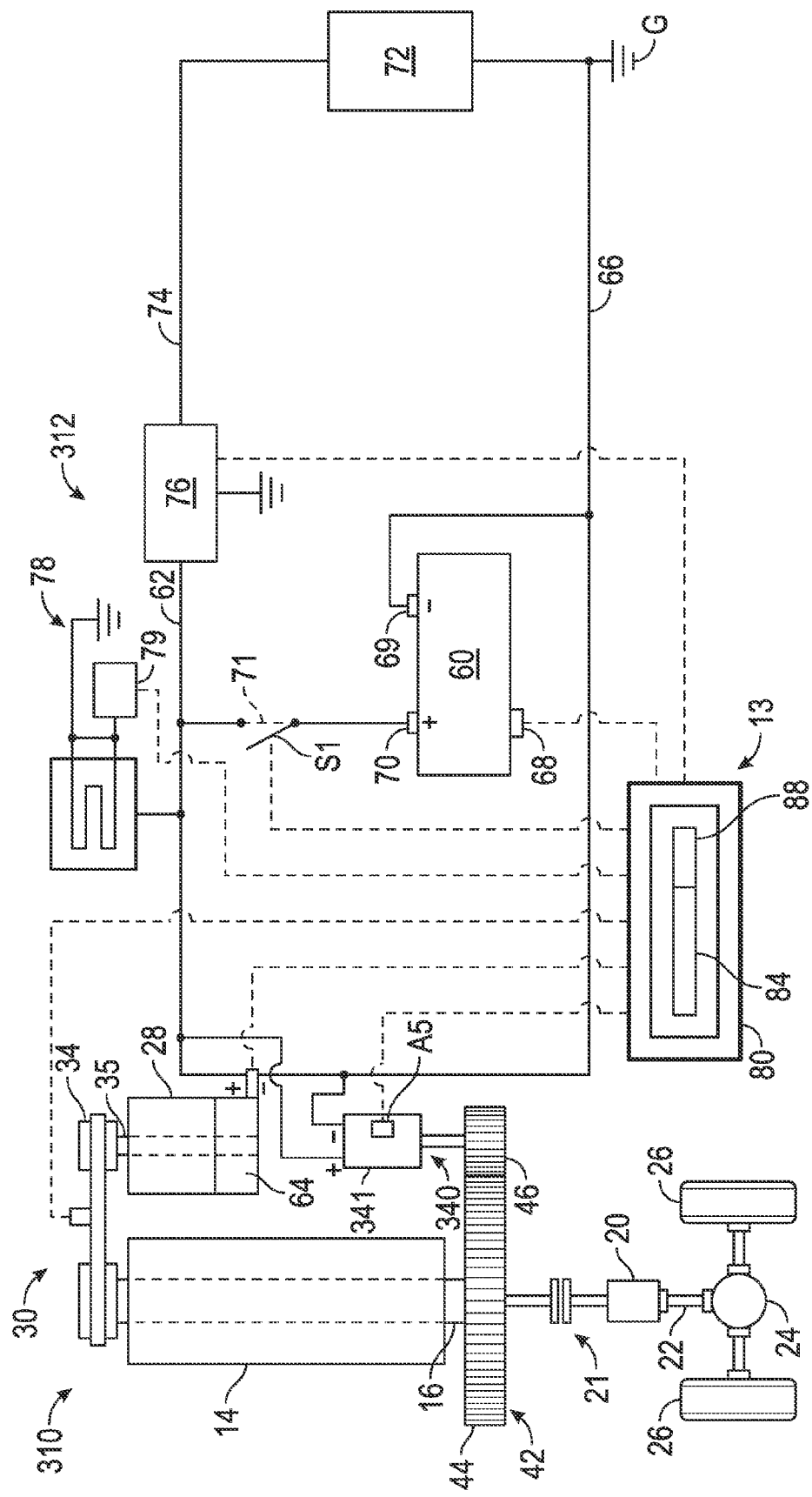
FIG. 4 is a schematic illustration of a portion of a fourth vehicle having a fourth embodiment of a hybrid powertrain.

Referring now to FIG. 4, a vehicle 310 with a hybrid powertrain 312 is similar to that of FIG. 2 except that a starter mechanism 340 that includes a starter motor 341 used to provide torque to rotate the crankshaft 16 through the gears 44, 46. An actuator A5 is controlled by the control system 13 to power the starter motor 341. The actuator A5 is activated during the same operating modes that the actuators A1 and A2 of FIG. 2 are activated. The hybrid powertrain 312 is operable in all of the modes described with respect to powertrain 112.

In the hybrid powertrain 312, the motor/generator 28 is not used to provide a driving connection to the crankshaft 16 through the gears 44, 46. In fact, the motor/generator 28 is always decoupled from the starter motor 41. Accordingly, a selective coupling device 38 is not required between the pulley 34 and the shaft 35, and therefore no actuator A3 is required.

Figure 5:
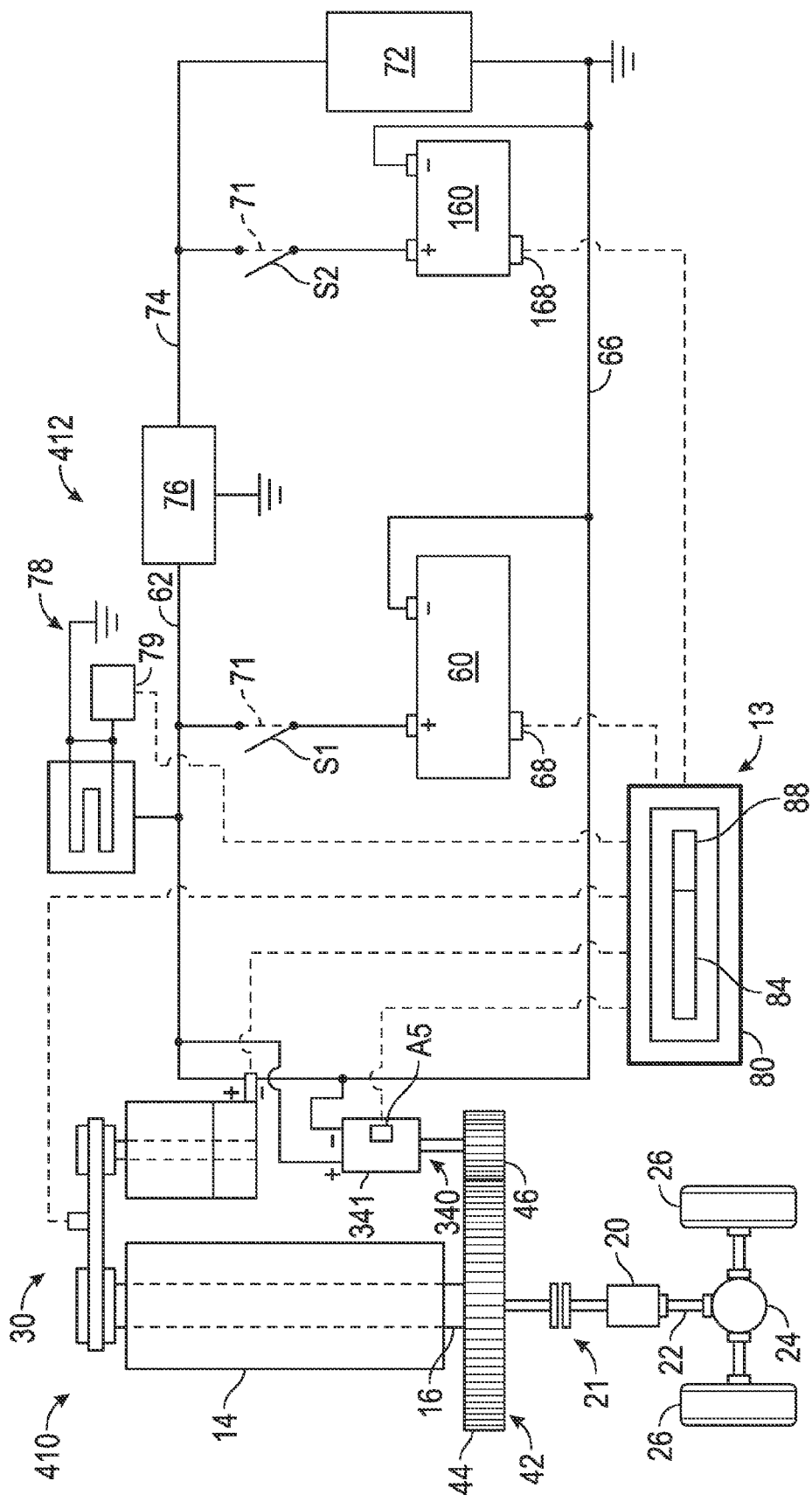
FIG. 5 is a schematic illustration of a portion of a fifth vehicle having a fifth embodiment of a hybrid powertrain.

Referring now to FIG. 5, a vehicle 410 with a hybrid powertrain 412 is similar to that of FIGS. 2 and 3 except including the starter mechanism 340 with the starter motor 341 and the actuator A5 as described with respect to FIG. 4. No selective coupling device 38 is required between the pulley 34 and shaft 35, and thus no actuator A3 is required. The hybrid powertrain 412 is operable in all of the same modes as described with respect to powertrain 112.

Figure 9:
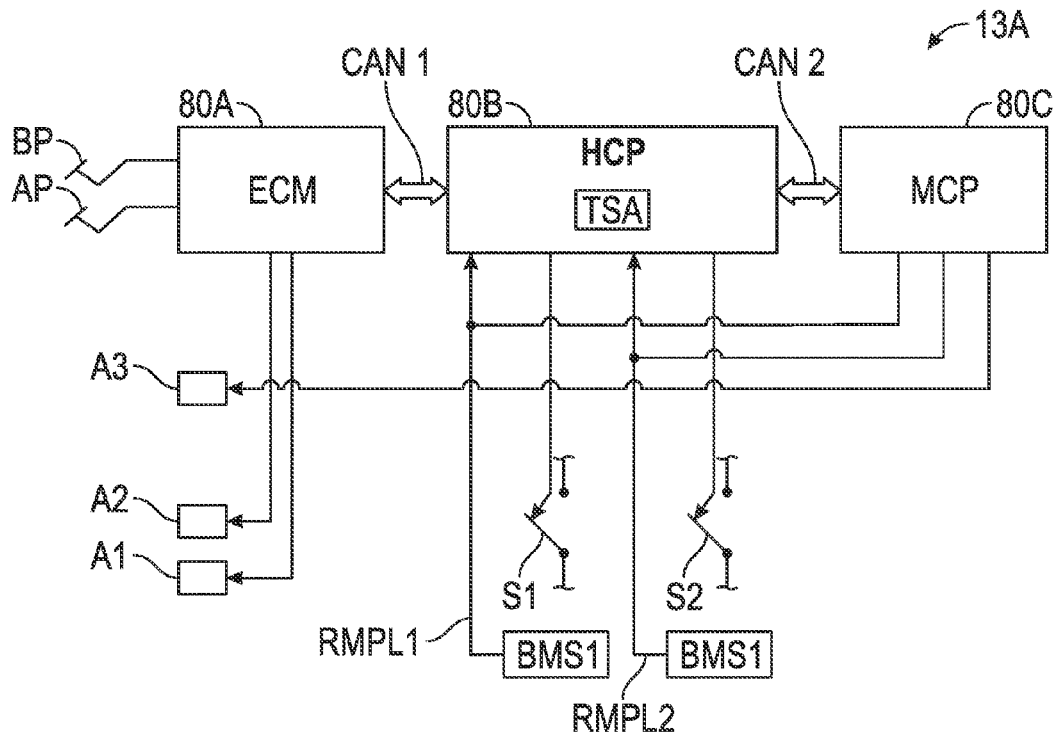
FIG. 9 is a schematic illustration of a first embodiment of a control system for any of the hybrid powertrains of FIGS. 1-5.

FIG. 9 is a schematic illustration of a first embodiment of a control system 13A for any of the powertrains of FIGS. 1-5. The control system 13A functions as described with respect to control system 13. The control system 13A includes a first embodiment of control architecture that utilizes interfacing electronic controllers to carry out the control algorithm required for the specific powertrain 12, 112, 212, 312, 412. A first electronic controller 80A that may be referred to as an engine control module ECM interfaces such as over a first CAN1 network with a second electronic controller 80B, referred to as a hybrid control module or a hybrid control processor HCP. The HCP interfaces with a third electronic controller 80C, also referred to as a motor control processor MCP, over a second CAN2 network.

Figure 10:
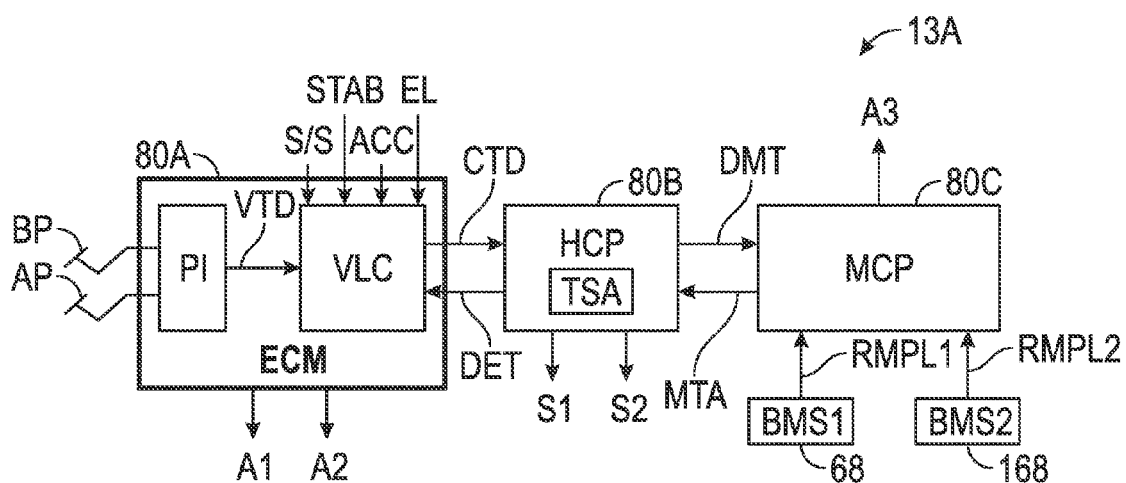
FIG. 10 is a schematic illustration of the control system of FIG. 9 illustrating torque control functions.

As best shown in FIG. 10, the HCP performs a torque split algorithm TSA that determines how the motor/generator 28 and the engine 14 will be controlled in a complementary manner to satisfy a required vehicle torque. The ECM and the MCP in turn then execute torque commands sent by the HCP to carry out the torque split determined by the TSA. Specifically, the ECM receives brake pedal input signal BP and accelerator pedal input AP and executes an algorithm PI that determines vehicle torque demand VTD based on brake pedal input BP and accelerator pedal input AP. Typically, only the brake pedal or only the accelerator pedal will be depressed at one time, and input from the other pedal will indicate no depression.

The ECM receives input from various vehicle level controls that may affect the torque required from the engine 14 and/or from the motor/generator 28, such as from a start/stop system S/S, from a fraction stability system STAB, from an air conditioning compressor clutch system ACC, and from vehicle electrical loads EL, such as electrical loads of the vehicle electrical systems 72 of FIG. 2. The start/stop system S/S input may include sensor input from sensors operatively connected to the motor/generator 28, the engine 14, the accelerator pedal AP, or the brake pedal BP and may be indicative of conditions under which the engine 14 should be stopped or started. The ECM executes an algorithm VLC that adjusts the torque demand VTD based on the pedal inputs in light of the vehicle level controls, and determines a crankshaft torque demand CTD based on these inputs. The crankshaft torque demand CTD as well as the pedal inputs BP, AP are communicated to the HCP by the ECM.

The MCP in turn receives input signals from the battery management systems BMS1 68 and BMS2 168 previously described with respect to FIGS. 1 and 2. The input signals RMPL1 and RMPL2, respectively, from BMS1 68 and BMS2 168 indicate the maximum regenerative braking and motoring power limits of the motor/generator 28. The MCP executes a stored algorithm that computes the maximum possible torque that can be provided by the motor/generator 28 based on the power limits indicated by the BMS1 and BMS2, and based on temperature of the motor/generator 28, including temperature of the MPIM 64. The maximum possible torque of the motor/generator 28 is then communicated to the HCP by the MCP.

The HCP receives the maximum possible motor/generator torque from the MCP and the crankshaft torque demand CTD from the ECM and, based on the inputs, performs the torque split algorithm TSA to compute a desired engine torque command DET to the ECM and a desired motor torque command DMT to the MCP. The TSA may determine the DET and the DMT using a look-up table or by calculating power losses in the motor/generator 28, friction losses in the engine 14, or based on other factors correlated with the vehicle operating parameters provided as input signals to the control system 13B to optimize torque split for optimal fuel economy performance and/or torque reserve. The HCP also sends control signals to the switching devices S1 and S2 (in embodiments that include a switching device S2).

The ECM receives the engine torque command DET and executes control of the engine 14, such as by controlling engine valve actuation, etc., to achieve the commanded engine torque. The ECM also sends control signals to the actuators A1 and A2 (or, alternatively, to actuators A4 or A5 in the embodiments of FIG. 3, 4, or 5) as necessary to implement the mode selection algorithm MSA in light of the control logic indicated in FIG. 8. The MCP receives the desired motor torque command DMT and executes control of the motor/generator 28 to achieve the desired motor torque command DMT. The actual torque achieved MTA by the motor/generator 28 is determined by the MCP, such as based on various motor control sensors, and is communicated to the HCP. The HCP can then further refine the torque split algorithm TSA in light of the MTA. The MCP also sends a control signal to the actuator A3 to control the coupling device 38 in embodiments that include a coupling device 38 as necessary to implement the mode selection algorithm MSA in light of the control logic indicated in FIG. 8.

Figure 11:
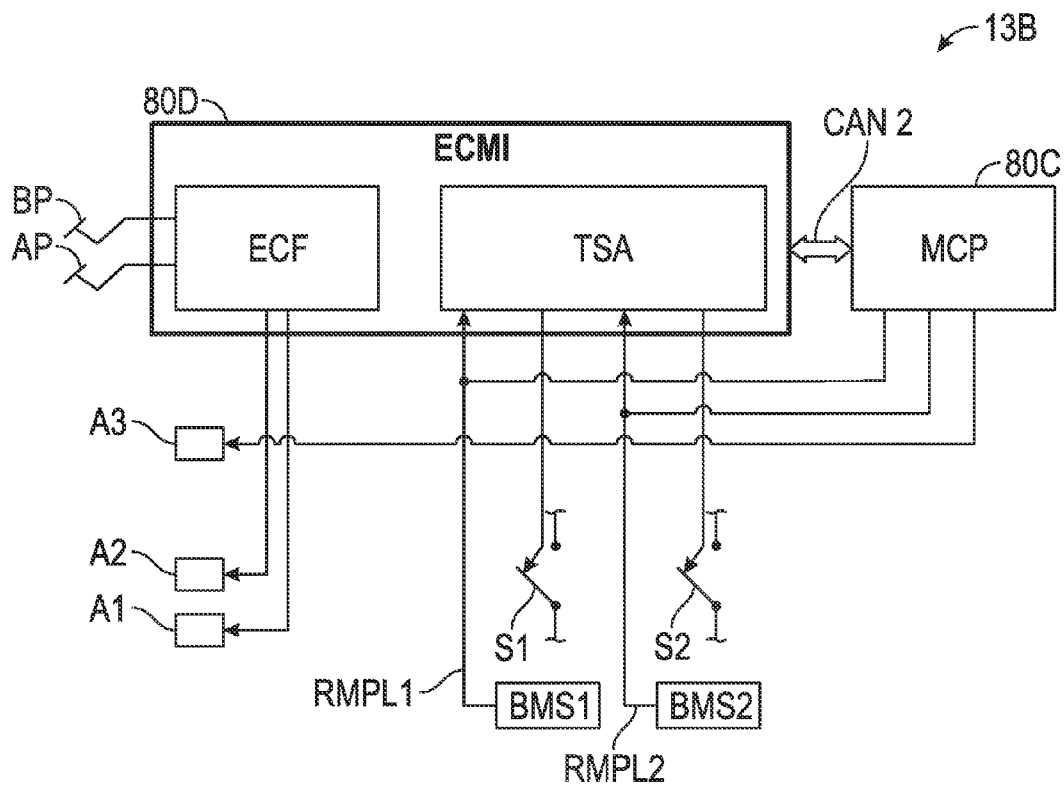
FIG. 11 is a schematic illustration of a second embodiment of a control system for any of the hybrid powertrains of FIGS. 1-5.
Figure 12:
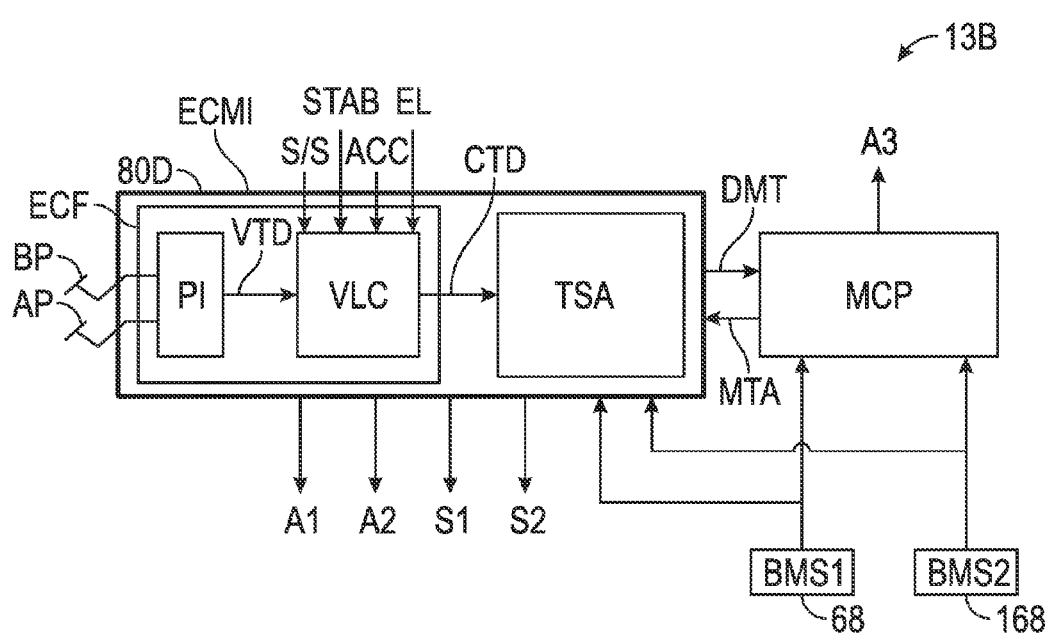
FIG. 12 is a schematic illustration of the control system of FIG. 11 illustrating torque control functions.

FIG. 11 is a schematic illustration of a second embodiment of a control system 13B for any of the powertrains of FIGS. 1-5. The control system 13B functions as described with respect to control system 13. The control system 13B includes a second embodiment of control architecture that utilizes interfacing electronic controllers to carry out the control algorithm required for the specific powertrain 12, 112, 212, 312, 412. Specifically, an electronic controller 80D may be referred to as an engine control module ECM1 and interfaces such as over a CAN2 network with a second electronic controller 80C which is the MCP as described with respect to FIGS. 9 and 10. The ECM1 performs all of the functions as described with respect to the ECM of FIGS. 9 and 10, and also performs the TSA function by the HCP in the embodiment of FIGS. 9 and 10. No separate HCP is included in the control system 13B as the hybrid control functionality is integrated into ECM1. As such, no control signal for desired engine torque DET is required, as the ECM1 both determines and executes the desired engine torque. Accordingly, one of the benefits of integrated hybrid control functionality and engine control functionality in a single ECM1 is that communication latencies and associated torque spikes are not encountered and thus need not be managed.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A hybrid powertrain comprising:
an engine having a crankshaft;
a motor/generator;
a belt drive train operatively connectable to the crankshaft and to the motor/generator for establishing a driving connection therebetween;
a gear train operatively connected to the crankshaft separately from the belt drive train;
a starter mechanism controllable to selectively establish a driving connection to the crankshaft through the gear train;
at least one actuator activatable to establish the driving connection between the engine and the motor/generator via the gear train;
a first energy storage device operable within a first range of operating voltage;
a first switching device controllable for selectively establishing electrical power flow between the first energy storage device and the motor/generator; wherein no energy storage device is continuously operatively connected to the motor/generator;
a control system having at least one electronic controller operatively connected to and controlling the engine, the motor/generator, the starter mechanism, the first switching device, and said at least one actuator;
wherein said at least one electronic controller executes a stored algorithm and controls the hybrid powertrain in accordance with the stored algorithm to establish any one of multiple operating modes in at least partial dependence upon at least one of a parameter of the first energy storage device, a parameter of the control system, a parameter of the motor/generator, and a parameter of said at least one actuator.

2. The hybrid powertrain of claim 1, further comprising:
a selective coupling device selectively establishing a driving connection between the crankshaft and the motor/generator through the belt drive train;
wherein the first energy storage device is the only energy storage device operatively connectable to the motor/generator;
wherein said multiple operating modes include an auto-stop mode, a key start mode, and an auto-start mode;
wherein said at least one electronic controller controls the hybrid powertrain such that the motor/generator functions as a motor, the selective coupling device is disengaged, the starter mechanism establishes a driving connection to the crankshaft through the gear train, and the first switching device establishes electrical power flow to the motor/generator in each of the auto-stop mode, the key start mode, and the auto-start mode;
wherein said at least one parameter of the first energy storage device includes a state-of-charge and a temperature;
wherein said at least one electronic controller controls the hybrid powertrain to establish the auto-stop mode or the key start mode only if the state-of-charge of the energy storage device satisfies a first predetermined state-of-charge level and the temperature of the first energy storage device satisfies a first predetermined temperature level; and
wherein said at least one electronic controller controls the hybrid powertrain to establish the auto-start mode only if the state-of-charge of the first energy storage device satisfies a second predetermined state-of-charge level different than the first predetermined state-of-charge level.

3. The hybrid powertrain of claim 1, further comprising:
a selective coupling device selectively establishing a driving connection between the crankshaft and the motor/generator through the belt drive train;
wherein the first energy storage device is the only energy storage device operatively connectable to the motor/generator;
wherein said multiple operating modes include a torque boost mode and a regenerative braking mode;
wherein said at least one electronic controller controls the hybrid powertrain such that the motor/generator functions as a motor, the selective coupling device is engaged, the starter mechanism does not establishes a driving connection to the crankshaft through the gear train, and the first switching device establishes electrical power flow from the first energy storage device to the motor/generator in the torque boost mode;
wherein said at least one electronic controller controls the hybrid powertrain such that the motor/generator functions as a generator, the selective coupling device is engaged, the starter mechanism does not establish a driving connection between the motor/generator and the crankshaft through the gear train, and the first switching device establishes electrical power flow from the motor/generator to the first energy storage device in the regenerative braking mode;
wherein said at least one parameter of the first energy storage device includes a state-of-charge and a temperature;
wherein said at least one electronic controller controls the hybrid powertrain to establish the torque boost mode only if the state-of-charge of the first energy storage device satisfies a predetermined state-of-charge level and the temperature of the first energy storage device satisfies a predetermined temperature level; and
wherein said at least one electronic controller controls the hybrid powertrain to establish the regenerative braking mode only if the state-of-charge of the first energy storage device satisfies a different predetermined state-of-charge level and the temperature of the first energy storage device satisfies a different predetermined temperature level.

4. The hybrid powertrain of claim 1, wherein the gear train has multiple gears; wherein said at least one actuator includes a first linear actuator configured to move to an actuated position to thereby engage a first of said gears with a second of said gears, and includes a second linear actuator configured to move to an actuated position to thereby engage a third of said gears with a fourth of said gears;

wherein the starter mechanism establishes a driving connection between the motor/generator and the crankshaft through the gear train only when both the first linear actuator and the second linear actuator are moved to the respective actuated positions.

5. The hybrid powertrain of claim 1, wherein the starter mechanism includes a selectively engageable clutch that establishes a driving connection from the motor/generator to the crankshaft through the gear train when engaged.

6. The hybrid powertrain of claim 1, wherein the starter mechanism includes a starter motor controllable to provide driving torque to the crankshaft through the gear train.

7. The hybrid powertrain of claim 1, further comprising:
a second energy storage device operable within a second range of operating voltage at least partially lower than the first range of operating voltage;
a second switching device controllable for selectively establishing electrical power flow between the second energy storage device and the motor/generator;
wherein electrical power flow between the second energy storage device and the motor/generator is in parallel with electrical power flow between the first energy storage device and the motor/generator;
wherein said at least one electronic controller is operatively connected to the second switching device; and
wherein said multiple operating modes including an operating mode in which the second switching device establishes an electrical connection between the second energy storage device and the motor/generator and that is dependent upon at least one parameter of the second energy storage device.

8. The hybrid powertrain of claim 7, further comprising:
a selective coupling device selectively establishing a driving connection between the crankshaft and the motor/generator through the belt drive train;
wherein said multiple operating modes include an engine ignition off mode and a first key start mode;
wherein said at least one electronic controller controls the hybrid powertrain such that the motor/generator functions as a motor, the selective coupling device is disengaged, the starter mechanism establishes a driving connection to the crankshaft through the gear train, the first switching device does not establish electrical power flow between the first energy storage device and the motor/generator; and the second switching device establishes electrical power flow to the motor/generator in each of the engine ignition off mode, and the first key start mode;
wherein said at least one electronic controller controls the hybrid powertrain to establish the engine ignition off mode or to establish the first key start mode only if a state-of-charge of the second energy storage device satisfies a predetermined state-of-charge level and a temperature of the second energy storage device satisfies a predetermined temperature level.

9. The hybrid powertrain of claim 8, wherein said multiple operating modes include an auto-stop mode, a second key start mode, and an auto-start mode;
wherein said at least one electronic controller controls the hybrid powertrain such that the motor/generator functions as a motor, the selective coupling device is disengaged, the starter mechanism establishes a driving connection to the crankshaft through the gear train, the second switching device does not establish electrical power flow between the second energy storage device and the motor/generator; and the first switching device establishes electrical power flow from the first energy storage device to the motor/generator in each of the auto-stop mode, the second key start mode, and the auto-start mode; and
wherein said at least one controller generates control signals that establish the auto-start mode only if a state-of-charge of the second energy storage device is at a predetermined state-of-charge different than a predetermined state-of-charge required in the second key start mode.

10. The hybrid powertrain of claim 8, wherein said multiple operating modes include a first torque boost mode, and a second torque boost mode;
wherein said at least one electronic controller controls the hybrid powertrain such that the motor/generator functions as a motor, the selective coupling device provides a driving connection between the engine and the motor/generator through the belt drive train, the starter mechanism does not establish a driving connection to the crankshaft through the gear train, the first switching device establishes electrical power flow from the first energy storage device to the motor/generator and the second switching device establishes electrical power flow from the second energy storage device to the motor/generator in the first torque boost mode;
wherein said at least one electronic controller controls the hybrid powertrain such that the motor/generator functions as a motor, the coupling device provides a driving connection between the engine and the motor/generator through the belt drive train, the starter mechanism does not establish a driving connection between the motor/generator and the crankshaft through the gear train, the first switching device establishes electrical power flow from the first energy storage device to the motor/generator and the second switching device does not establish electrical power flow from the second energy storage device to the motor/generator in the second torque boost mode; and
wherein said at least one electronic controller controls the hybrid powertrain to establish either of the torque boost modes only if predetermined state-of-charge and temperature levels of the energy storage devices are satisfied.

11. The hybrid powertrain of claim 8, wherein said multiple operating modes include a first regenerative braking mode;
wherein said at least one electronic controller controls the hybrid powertrain such that the motor/generator functions as a generator, the selective coupling device is engaged, the starter mechanism does not establish a driving connection between the motor/generator and the crankshaft through the gear train, the first switching device establishes electrical power flow from the motor/generator to the first energy storage device, and the second switching device does not establish electrical power flow between the motor/generator and the second energy storage device in the first regenerative braking mode.

12. The hybrid powertrain of claim 11, wherein said multiple operating modes include at least one additional regenerative braking mode;
wherein said at least one electronic controller controls the hybrid powertrain such that the motor/generator functions as a generator, the selective coupling device is engaged, the starter mechanism does not establish a driving connection between the motor/generator and the crankshaft through the gear train, the first switching device establishes electrical power flow from the motor/generator to the first energy storage device, and the second switching device establishes electrical power flow between the motor/generator and the second energy storage device in said at least one additional regenerative braking mode; and
wherein the first switching device is operated in an on position of an on/off mode and the second switching device is operated in a linear mode in said at least one additional regenerative braking mode.

13. The hybrid powertrain of claim 12, wherein said at least one additional regenerative braking mode includes a second regenerative braking mode and a third regenerative braking mode;
wherein said at least one parameter of the first energy storage device includes a state-of-charge of the first energy storage device;
wherein said at least one parameter of the second energy storage device includes a state-of-charge of the second energy storage device;
wherein the state-of-charge of the first energy device is greater than a first predetermined state-of-charge threshold for the first energy storage device and the state-of-charge of the second energy device is less than a second state-of-charge threshold for the first energy storage device in the second regenerative braking mode;
wherein the state-of-charge of the first energy device is greater than the first state-of-charge threshold and the state-of-charge of the second energy device is greater than the second state-of-charge threshold in the third regenerative braking mode; and wherein the state-of-charge thresholds of the first energy storage device vary with temperature of the first energy storage device.

14. The hybrid powertrain of claim 1, further comprising:
a selective coupling device selectively establishing a driving connection between the crankshaft and the motor/generator through the belt drive train;
wherein the selective coupling device includes at least one of a clutch having an engaged state in which the clutch operatively connects the motor/generator to the engine through the belt drive train, and a variable tensioner system controllable for adjusting tension of the belt drive train.

15. The hybrid powertrain of claim 1, further comprising:
a selective coupling device selectively establishing a driving connection between the crankshaft and the motor/generator through the belt drive train;
a second energy storage device operable within a second range of operating voltage different than the first range of operating voltage;
a second switching device controllable for selectively establishing electrical power flow between the second energy storage device and the motor/generator;
wherein electrical power flow between the second energy storage device and the motor/generator is in parallel with electrical power flow between the first energy storage device and the motor/generator;
wherein said at least one electronic controller is operatively connected to the second switching device; wherein the stored algorithm further establishes at least one operating mode in at least partial dependence upon a parameter of the second energy storage device and in which the second switching device establishes electrical power flow between the second energy storage device and the motor/generator;
wherein said at least one electronic controller includes:
an engine control module operable to control the engine and the starter mechanism and operable to receive braking input and accelerator input and determine a vehicle torque demand based partially on the braking input and the accelerator input;
a motor control processor operable to control the selective coupling device;
a hybrid control processor in operative communication with the engine control module, with the motor control processor, with the first and second switching devices, and with the first and second energy storage devices; wherein the stored algorithm includes a torque split algorithm executed by the hybrid control processor that determines an engine torque and a motor/generator torque to satisfy the vehicle torque demand; and
wherein the hybrid control processor provides an engine torque command to the engine control module instructing the engine control module to control the engine to provide the engine torque, and provides a motor/generator torque command to the motor control processor instructing the motor control processor to control the motor/generator to provide the motor torque.

16. The hybrid powertrain of claim 1, further comprising:
a selective coupling device selectively establishing a driving connection between the crankshaft and the motor/generator through the belt drive train;
a second energy storage device operable within a second range of operating voltage different than the first range of operating voltage;
a second switching device controllable for selectively establishing electrical power flow between the second energy storage device and the motor/generator;
wherein electrical power flow between the second energy storage device and the motor/generator is in parallel with electrical power flow between the first energy storage device and the motor/generator;
wherein said at least one electronic controller is operatively connected to the second switching device; wherein the stored algorithm further establishes at least one operating mode in at least partial dependence upon a parameter of the second energy storage device and in which the second switching device establishes electrical power flow between the second energy storage device and the motor/generator;
wherein said at least one electronic controller includes:
a motor control processor operable to control the selective coupling device;
an engine control module in operative communication with the motor control processor, with the first and second switching devices, and with the first and second energy storage devices; wherein the engine control module is operable to control the engine and the starter mechanism and operable to receive braking input and accelerator input and determine a vehicle torque demand based partially on the braking input and the accelerator input;
    wherein the stored algorithm includes a torque split algorithm executed by the engine control module that determines an engine torque and a motor/generator torque to satisfy the vehicle torque demand; and wherein the engine control module controls the engine to achieve the engine torque, and provides a motor/generator torque command to the motor control processor instructing the motor control processor to control the motor/generator to provide the motor torque.

17. The hybrid powertrain of claim 1, further comprising:
an auxiliary solar power system with an integral power control unit in electrical communication with the motor/generator and with said at least one electronic controller; and
wherein the stored algorithm accounts for electrical power provided by the auxiliary solar power system when establishing said multiple operating modes.

18. The hybrid powertrain of claim 1, further comprising:
an auxiliary electrical system establishing an electrical load and operatively connectable to the motor/generator regardless of whether the switching device establishes electrical power flow between the energy storage device and the motor/generator.

19. The hybrid powertrain of claim 1, wherein the parameter of said at least one actuator is one of an activated state, an inactivated state, and an actuation time.

20. The hybrid powertrain of claim 1, wherein the parameter of the first energy storage device is one of temperature of the first energy storage device and a state-of-charge of the first energy storage device;
    wherein the parameter of the control system is at least one of temperature of the control system and a state-of-health of the control system;
    wherein the parameter of the motor/generator is at least one of a temperature of the motor/generator and a state-of-health of motor/generator; and
    wherein the parameter of said at least one actuator is at least one an activated state, an inactivated state, and an actuation time.

21. A method of controlling a hybrid powertrain on a vehicle, wherein the hybrid powertrain has an engine and a motor/generator, the method comprising:
    determining vehicle operating parameters;
    establishing various operating modes of the powertrain by controlling, via at least one electronic controller, the engine, the motor/generator, a starter mechanism, at least one actuator, and a first switching device based at least partially on the vehicle operating parameters;
    wherein the vehicle operating parameters include at least one of:
        a parameter of the first energy storage device, a parameter of the control system, a parameter of the motor/generator, and a parameter of said at least one actuator;
    wherein the various operating modes include an operating mode in which the first switching device establishes electrical power flow between the first energy storage device and the motor/generator;
    wherein a driving connection is established between the crankshaft and the motor/generator through a belt drive train operatively connectable to a crankshaft of the engine and to the motor/generator;
    wherein the starter mechanism selectively establishes a driving connection to the crankshaft through the gear train separately from the belt drive train; and
    wherein said at least one actuator is activatable to establish the driving connection between the engine and the motor/generator via the gear train.

22. The method of claim 21, wherein the various operating modes include an auto-start mode and a key start mode in which the motor/generator functions as a motor, the first switching device establishes electrical power flow from the first energy storage device to the motor/generator, and the starter mechanism transfers torque to the crankshaft; wherein the parameter of the first energy storage device is at least one of temperature of the first energy storage device and a state-of-charge of the first energy storage device;
    wherein the parameter of the control system is at least one of temperature of the control system and a state-of-health of the control system;
    wherein the parameter of the motor/generator is at least one of a temperature of the motor/generator and a state-of-health of motor/generator; and
    wherein the parameter of said at least one actuator is at least one an activated state, an inactivated state, and an actuation time.

23. The method of claim 22, wherein at least some of the various operating modes are established by further controlling via the controller a second switching device that selectively establishes electrical power flow between a second energy storage device and the motor/generator;
    wherein the various operating modes further include an additional key start mode in which the motor/generator functions as a motor; the first switching device prevents electrical power flow from the first energy device to the motor/generator; the second switching device establishes electrical power flow from the second energy storage device to the motor/generator, the starter mechanism transfers torque to the crankshaft; and
    wherein the additional key start mode is dependent upon a predetermined state-of-charge and a predetermined temperature of the second energy storage device.

24. The method of claim 21, further comprising:
a selective coupling device selectively establishing a driving connection between the crankshaft and the motor/generator through the belt drive train;
    wherein at least some of the various operating modes are established by further controlling via the controller a second switching device that selectively establishes electrical power flow between a second energy storage device and the motor/generator;
    wherein the various operating modes include a first torque boost mode in which the motor/generator functions as a motor, the first switching device establishes electrical power flow from the first energy storage device to the motor/generator, the second switching device establishes electrical power flow from the second energy storage device to the motor/generator, and the selective coupling device enables torque transfer between the motor/generator and the crankshaft via the belt drive train;
    wherein the first torque boost mode is dependent upon the first energy storage device satisfying a predetermined state-of-charge level and a predetermined temperature level, and the second energy storage device satisfying a different predetermined state-of-charge level and a different predetermined temperature level;
    wherein the various operating modes include a second torque boost mode in which the motor/generator functions as a motor, the first switching device establishes electrical power flow from the first energy storage device to the motor/generator, the second switching device prevents electrical power flow from the second energy storage device to the motor/generator, and the selective coupling device enables torque transfer between the motor/generator and the crankshaft via the belt drive train; and wherein the second torque boost mode is dependent upon the first energy storage device satisfying a different predetermined state-of-charge and a different predetermined temperature level than in the first torque boost mode, and the second energy storage device satisfying a different predetermined state-of-charge level and a different predetermined temperature level than in the first torque boost mode.

25. The method of claim 21, further comprising:

a selective coupling device selectively establishing a driving connection between the crankshaft and the motor/generator through the belt drive train;

wherein at least some of the various operating modes are established by further controlling via the controller a second switching device that selectively establishes electrical power flow between a second energy storage device and the motor/generator;

wherein the various operating modes include a first regenerative braking operating mode in which the motor/generator functions as a generator, the first switching device establishes electrical power flow from the motor/generator to the first energy storage device, and the selective coupling device enables torque transfer between the motor/generator and the crankshaft via the belt drive train; wherein the first regenerative braking mode is dependent upon a predetermined state-of-charge and a predetermined temperature of the first energy storage device, and a predetermined state-of-charge and a predetermined temperature of the second energy storage device;

wherein the various operating modes includes a second regenerative braking operating mode and a third regenerative braking operating mode in which the motor/generator functions as a generator, the first switching device establishes electrical power flow from the motor/generator to the first energy storage device, the second switching device establishes electrical power flow from the motor/generator to the second energy storage device, and the selective coupling device enables torque transfer between the motor/generator and the crankshaft via the belt drive train; wherein the second regenerative braking mode is dependent upon a different predetermined state-of-charge and a different predetermined temperature of the first energy storage device than in the first regenerative braking mode, and a different predetermined state-of-charge and a different predetermined temperature of the second energy storage device than in the first regenerative braking mode;

wherein the third regenerative braking mode is dependent upon a different predetermined state-of-charge and another different predetermined temperature of the first energy storage device than in the first and second regenerative braking modes, and another different predetermined state-of-charge and another different predetermined temperature of the second energy storage device than in the first and second regenerative braking modes; and wherein the second switching device is controlled to operate in a linear mode in the second and third regenerative braking modes.

26. A method of controlling a hybrid powertrain on a vehicle, wherein the hybrid powertrain has an engine and a motor/generator, the method comprising:

determining vehicle operating parameters;

establishing various operating modes of the hybrid powertrain by controlling, via at least one electronic controller, the engine, the motor/generator, a starter mechanism, at least one actuator, and a first switching device based at least partially on the vehicle operating parameters;

wherein the vehicle operating parameters include a capacity to restart the engine of at least one of the first energy storage device, said at least one electronic controller, the motor/generator, the starter mechanism, and said at least one actuator;

wherein the various operating modes include an operating mode in which the first switching device establishes electrical power flow between the first energy storage device and the motor/generator;

wherein a driving connection is established between the crankshaft and the motor/generator through a belt drive train operatively connectable to a crankshaft of the engine and to the motor/generator; and wherein the starter mechanism selectively establishes a driving connection to the crankshaft through the gear train separately from the belt drive train; wherein said at least one actuator is activatable to establish the driving connection between the engine and the motor/generator via the gear train.

27. The method of claim 26, wherein the capacity to restart the engine includes at least one of:

temperature of the first energy storage device, a state-of-charge of the first energy storage device, temperature of the control system, a state-of-health of the control system, temperature of the motor/generator, a state-of-health of motor/generator, a state of said at least one actuator and an actuation time of said at least one actuator.

* * * * *